United States Patent [19]
Paulson et al.

[11] Patent Number: 5,661,964
[45] Date of Patent: Sep. 2, 1997

[54] FRESH MARKET SWEET CORN HARVESTER

[75] Inventors: Bernard S. Paulson, Clear Lake; Bruce H. Paulson, Clayton, both of Wis.

[73] Assignee: Pixall Limited Partnership, Clear Lake, Wis.

[21] Appl. No.: 540,851

[22] Filed: Oct. 11, 1995

[51] Int. Cl.$^6$ ................................................. A01D 45/02
[52] U.S. Cl. ................... 56/64; 56/105; 56/109; 56/119; 460/36
[58] Field of Search ....................... 56/64, 63, 94, 56/103, 105, 109, 112, 119, 1; 460/36

[56] References Cited

U.S. PATENT DOCUMENTS

| | | | |
|---|---|---|---|
| 2,854,806 | 10/1958 | Slavens | 56/103 |
| 3,596,448 | 8/1971 | Van Buskirk | 56/63 |
| 3,736,734 | 6/1973 | Pavel | 56/94 X |
| 3,885,375 | 5/1975 | Solterbeck | 56/105 X |

OTHER PUBLICATIONS

Pixall, 4-Row Corn Puller, CP200, CP 400, CP400L Operator's Manual, 35 pages (Date-Unknown).

*Primary Examiner*—Terry Lee Melius
*Attorney, Agent, or Firm*—Faegre & Benson LLP

[57] ABSTRACT

A fresh market sweet corn harvester for removing ears of corn from corn stalks. The harvester is configured to be mounted to a drive chassis for over-the-ground travel and includes a lower frame with one or more cutters for cutting lower portions of the corn stalks at a cut height above the ground. Hydraulic cylinders extending between the lower frame and the chassis are actuated from within the chassis operator compartment to raise and lower the lower frame and adjust the cut height. An upper frame is pivotally mounted with respect to the lower frame, One or more gathering mechanisms and one or more stripping mechanisms are mounted to the upper frame. The gathering mechanisms engage upper portions of the cut corn stalks and pull the stalks through the harvester. The stripping mechanisms remove ears of corn from the stalks as they are pulled through the harvester by the gathering mechanisms. Hydraulic screw jacks extending between the lower and upper frames are actuated from within the operator compartment to raise and lower the stripping mechanisms to independently adjust the stripping window height.

20 Claims, 6 Drawing Sheets

FRESH MARKET SWEET CORN HARVESTER

BACKGROUND OF THE INVENTION

1. Field of the Invention

The present invention is a device for harvesting ears of fresh sweet corn.

2. Background of the Invention

Fresh market sweet corn (i.e., fresh corn distributed in its husk) can command premium market prices if it has "hand-picked" appearance and quality. These desirable characteristics include a long shank, intact outer flag leaves and no husk damage. However, it can be relatively expensive and inefficient to pick fresh market sweet corn by hand. Mechanical headers or harvesters capable of harvesting fresh market sweet corn to hand-picked quality standards are therefore often used for this purpose. Harvesters of this type are commercially available from a number of manufacturers, including Pixall of Clear Lake, Wis.

The Pixall fresh market sweet corn harvester includes a mounting frame pivotally mounted to the front of a drive chassis, and a harvesting unit for each row of corn to be harvested. Hydraulic cylinders extending between the mounting frame and chassis are actuated to raise and lower the harvester. Each harvesting unit includes a cutter for cutting lower portions of the corns stalks at a cut height above the ground, a stripping mechanism for removing ears of corn from the cut stalks, and a gathering mechanism for engaging upper portions of the cut corn stalks at a gripping height and pulling the stalks through the stripping mechanism. The distance between the cutters and the stripping mechanisms is known as the stripping window height, and was set by spacers which were mounted to the harvester frame.

A gauge wheel is pivotally mounted to the leading edge of the harvester by a linkage, and can be raised and lowered by a hydraulic cylinder. The gauge wheel hydraulic cylinder and the mounting frame hydraulic cylinders are coupled to a header height hydraulic circuit by a float block which controls the distribution of hydraulic fluid between the cylinders in such a manner that most of the weight of the harvester is supported by the mounting frame hydraulic cylinders. When the header height hydraulic circuit is operated in a height adjustment mode, the mounting frame hydraulic cylinders and the gauge wheel hydraulic cylinder are actuated to raise and lower the harvester with respect to the chassis and ground, and thereby adjust the cut height of the harvester. When the header height hydraulic circuit is operated in a floating mode, the gauge wheel effectively functions as a ground height sensor, causing the hydraulic circuit to distribute fluid between the mounting frame cylinders and the gauge wheel cylinder in such a manner as to maintain the cutters at a constant cut height as the contour of the ground changes.

Fresh market sweet corn harvesters of the type described above generally operate most efficiently and provide the highest quality corn when set for a relatively high cut height and when the gathering unit engages the cut corn stalks relatively close to the ear. However, various varieties of sweet corn have differing plant characteristics. By way of example, the plants can have different heights, and the heights at which the ears tend to grow on the plants will vary between varieties. Furthermore, under different growing conditions the plant characteristics of any given variety can vary from field-to-field, and even within the same field. Given this range of variability in plant characteristics, it can be difficult to set and maintain the harvester at optimal conditions for high efficiency and high quality harvesting operations.

There is, therefore, a continuing need for improved fresh market sweet corn harvesters. In particular, there is a need for a harvester that can efficiently harvest different varieties of corn grown in varying field conditions. The harvester should be relatively convenient to operate. To be commercially viable, the harvester must also provide "hand-picked" quality.

SUMMARY OF THE INVENTION

The present invention is a fresh market sweet corn harvester that can efficiently harvest ears of corn from a wide range of plant varieties grown in varying field conditions. The harvester is convenient to operate and provides corn having hand-picked quality. One embodiment of the harvester is configured to be mounted to a drive chassis for over-the-ground travel and includes a mounting frame. One or more cutters are mounted with respect to the mounting frame for cutting lower portions of the corn stalks at a cut height above the ground. A cut height actuator raises and lowers the cutters to adjust the cut height. One or more gathering mechanisms are mounted with respect to the mounting frame for engaging the corn stalks cut by the cutters and pulling the stalks through the harvester. One or more stripping mechanisms are mounted with respect to the mounting frame for removing ears of corn from the stalks pulled through the harvester by the gathering mechanisms. A stripping window actuator raises and lowers the stripping mechanisms with respect to the cutters to adjust a stripping window height.

Another embodiment of the harvester includes a gathering unit frame pivotally mounted to the mounting frame. The gathering mechanisms and stripping mechanisms are mounted to the gathering unit frame. Screw jacks driven by hydraulic motors are used to raise and lower the gathering unit frame and adjust the stripping window height.

In yet another embodiment the harvester is mounted to a drive chassis including an operator compartment. An operator-actuated cut height control and an operated stripping window height control are located in the operator compartment. The cut height control is coupled to the cut height actuator to enable adjustment of the cut height from within the operator compartment. The stripping window height control is coupled to the stripping window actuator to enable adjustment of the stripping window height from within the operator compartment.

DETAILED DESCRIPTION OF THE PREFERRED EMBODIMENTS

Figure 1:
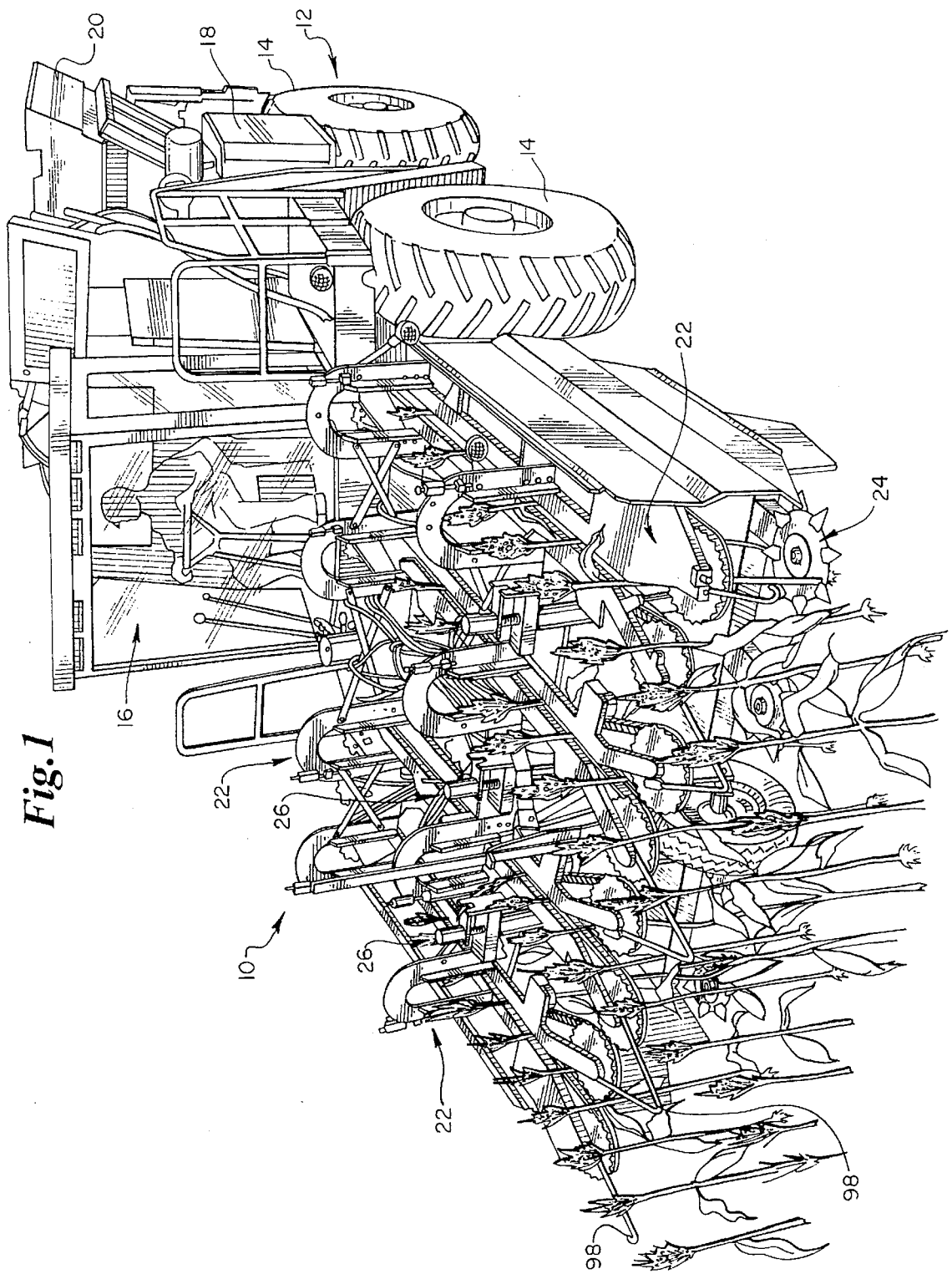
FIG. 1 is an illustration of a fresh market sweet corn harvester in accordance with the present invention mounted to a chassis and being driven through a field.
Figure 2:
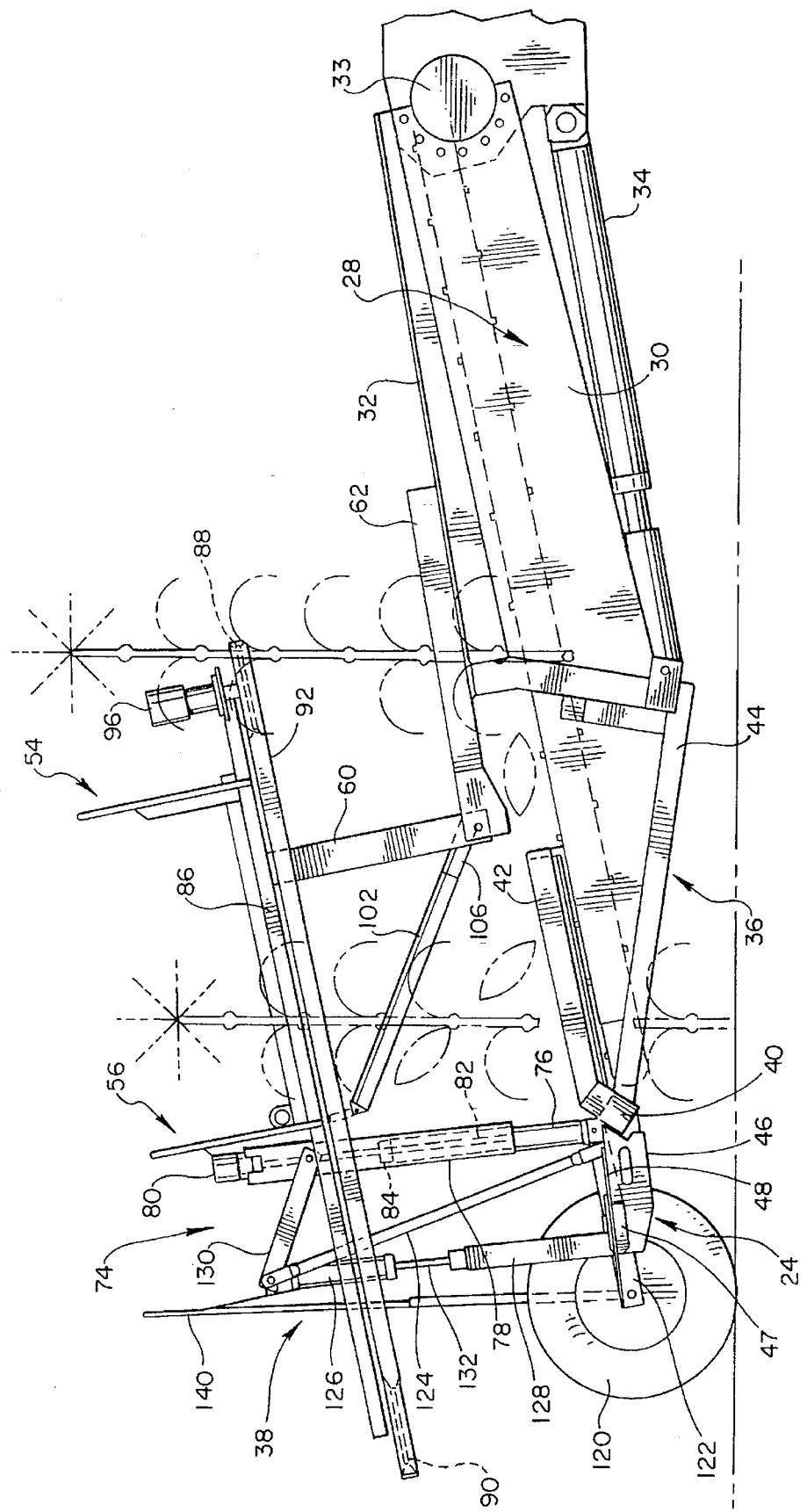
FIG. 2 is a detailed side view of the harvester shown in FIG. 1, with the stripping mechanism set at a first stripping window height.
Figure 3:
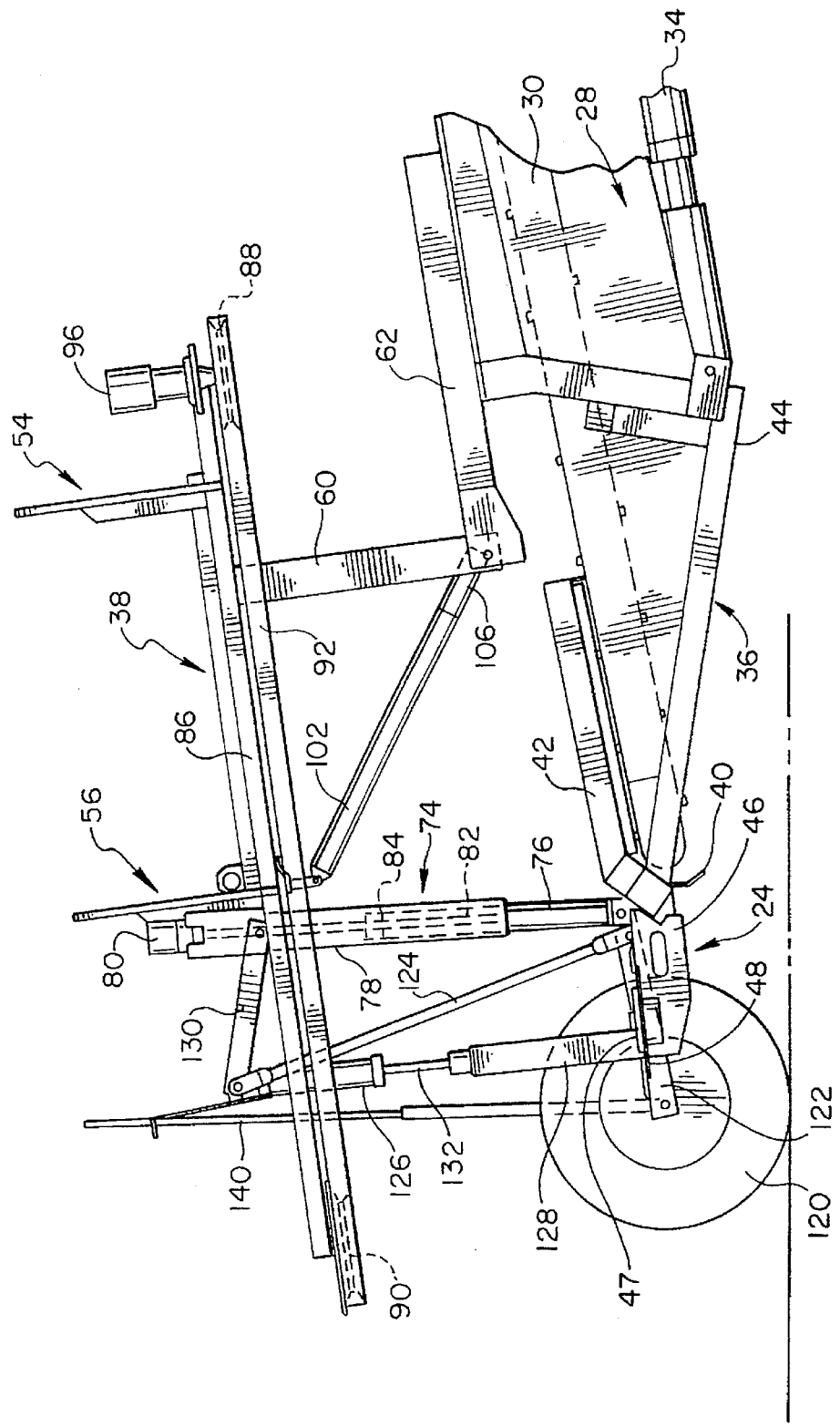
FIG. 3 is a detailed side view of the harvester shown in FIG. 1, with the stripping mechanism set at a second stripping window height which is greater than the stripping window height shown in FIG. 2.

A fresh market sweet corn header or harvester 10 in accordance with the present invention is shown in operation in FIG. 1. In the illustrated embodiment, harvester 10 is mounted to and driven through a field to be harvested by chassis 12. A Super-Jack chassis 12 manufactured by Pixall of Clear Lake, Wis., is shown in FIG. 1 for purposes of example and includes wheels 14, operator compartment 16, engine 18 and hopper 20. Harvester 10 is a four row unit in the embodiment shown, and includes a harvesting unit 22 for each row of corn to be harvested. Each harvesting unit 22 includes a cutter 24 for cutting lower portions of corn stalks at a cut height above the ground, a stripping mechanism (not visible in FIG. 1) for removing ears of corn from the cut stalks, and a gathering mechanism 26 for engaging upper portions of the cut corn stalks at a gripping height and pulling the stalks through the stripping unit. The distance between the cutters 24 and the stripping mechanisms 26 is known as the stripping window height. As described in greater detail below, the cut height and the stripping window height are independently adjustable, thereby enhancing the harvesting efficiency of harvester 10 while providing produce of hand-picked quality.

Harvester 10 can be described in greater detail with reference to FIGS. 1–6. As shown, the harvester 10 includes an inverted channel-shaped mounting frame 28 having a pair of spaced side walls 30 and an upper wall 32. The rearward ends of side walls 30 are configured to be pivotally mounted to a mount 33 on the front of chassis 12. A lower or boot frame 36 is rigidly mounted to and extends from the front of mounting frame 28. An upper or gathering unit frame 38 is pivotally mounted to the mounting frame 28 above the boot frame 36.

Mounting frame hydraulic cylinders 34 extend between the mounting frame 28 and the chassis 12, and are fluidly coupled in a header height control hydraulic circuit to a pump (not shown) in chassis 12. The header height control hydraulic circuit includes an operator-actuated height control lever or switch (not shown) in operator compartment 16. The header height control hydraulic circuit can be operated in both height adjust and floating modes, and also includes an operator-actuated mode control switch (not shown) in operator compartment 16 for selecting the operating mode. When operated in the height adjust mode, the height control switch is actuated to raise and lower the harvester 10 with respect to the ground, and thereby adjust the cut height.

Boot frame 36 includes a boot bar 40, upper mounting tubes 42 and lower mounting tubes 44. Boot bar 40 extends transversely across the full width of the leading edge of harvester 10, and is mounted to the mounting frame 28 by tubes 42 and 44. A lower mounting tube 44 extends between boot bar 40 and the lower edge of each mounting frame side wall 30.

Cutters 24 each include a support 46 which is mounted to and extends forwardly from the boot bar 40, and a hydraulic motor 47 mounted to the support. A cutter disk 48 with blades 50 extending therefrom is mounted to each hydraulic motor 47. Hydraulic motors 47 are fluidly coupled in a cutter hydraulic circuit to a pump (not shown) in chassis 12. The cutter hydraulic circuit includes an operator-actuated control (not shown) in operator compartment 16 to control the flow of hydraulic fluid to motors 47. Cutter disks 48 are rotated by the hydraulic motors 47 to cut the corn stalks at the cut height.

Gathering unit frame 38 includes a rearward frame section 54, a forward frame section 56 and horizontal support tube 58 which extends between the rearward and forward frame sections. The gathering unit frame 38 is pivotally mounted to the mounting frame 28 by upright support post 60. The upper end of support post 60 is welded to support tube 58, while the lower end of the support post is pivotally mounted to bracket 62. Bracket 62 is welded to the center of upper wall 32 of mounting frame 28, and extends forwardly over boot frame 36.

Rearward frame section 54 includes an arch 66 associated with each harvesting unit 22. Arches 66 are mounted to one another by brackets 68. As perhaps best shown in FIGS. 5 and 6, the center bracket 68 is welded to the rearward end of support tube 58. Similarly, forward frame section 56 includes arches 70 which are mounted to one another by brackets 72. The center bracket 72 is secured to the forward end of support tube 58.

The forward frame section 56 is supported above boot bar 40 by stripping window actuators 74. Actuators 74 are screw jacks in the embodiment shown, and each includes a lower tube 76 pivotally mounted to boot bar 40, and an upper tube 78 mounted to the forward frame section 56. Upper tubes 78 are larger than the lower tubes 76 so the upper tubes can telescope over the lower tubes. Stripping window actuators 74 also include hydraulic motors 80 which are mounted to the forward frame section 56 above each upper tube 78. Threaded rods 82 extend from motors 80 through each pair of tubes 76 and 78. Rods 82 also extend through nuts 84 which are fixedly mounted to the upper end of each lower tube 76. Hydraulic motors 80 are fluidly coupled in a stripping window hydraulic circuit to a pump (not shown) in chassis 12. The stripping window hydraulic circuit includes an operator-actuated control lever or switch (not shown) in operator compartment 16 to control the flow of hydraulic fluid to motors 80. Rods 82 are rotated by motors 80 to raise and lower gathering unit frame 38 with respect to boot frame 36 as the gathering unit frame pivots at the lower end of support post 60. The stripping window height of harvester 10 can thereby be adjusted by the operator from operator compartment 16.

Figure 4:
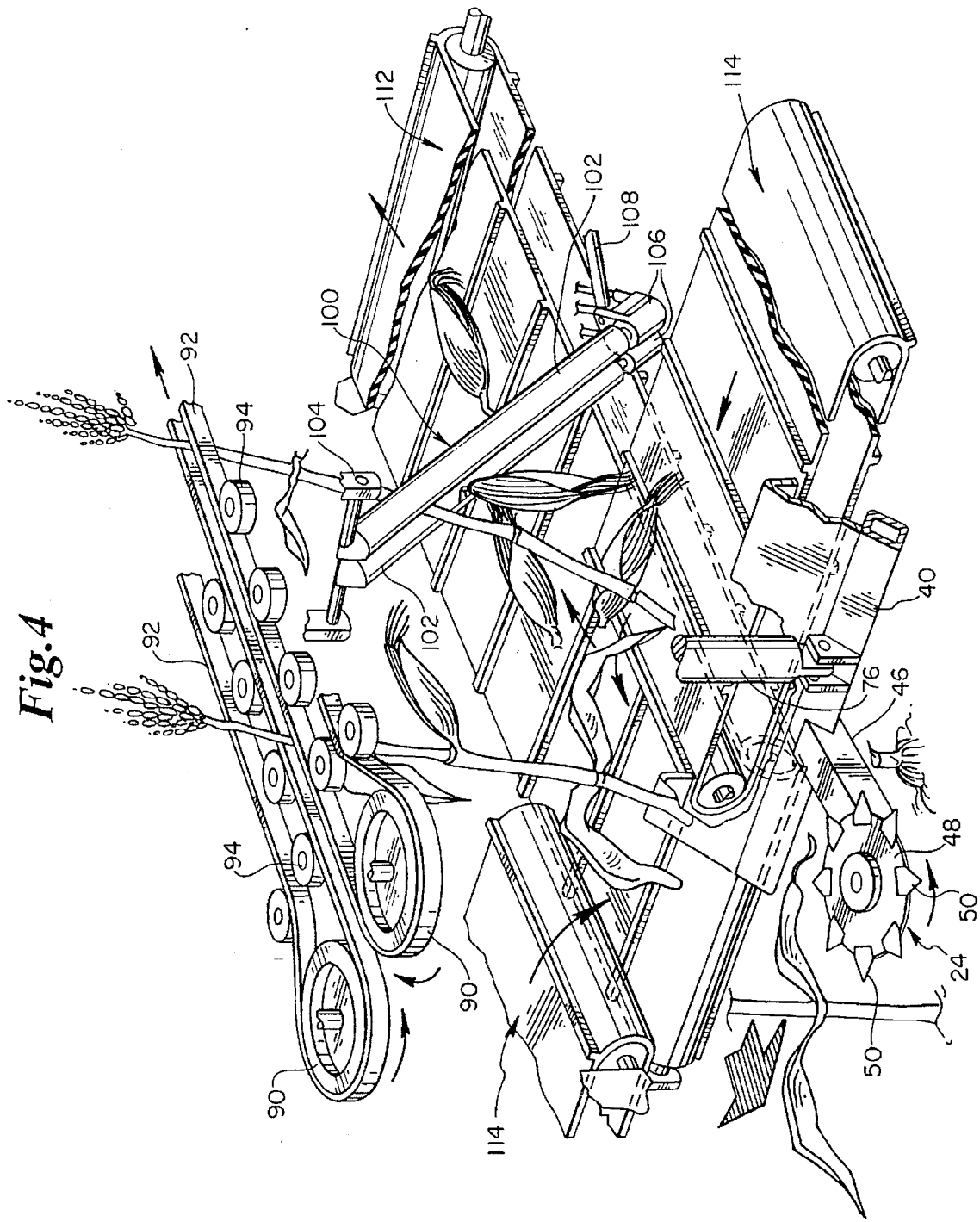
FIG. 4 is a detailed isometric view of one harvesting unit of the harvester shown in FIG. 1.
Figure 5:
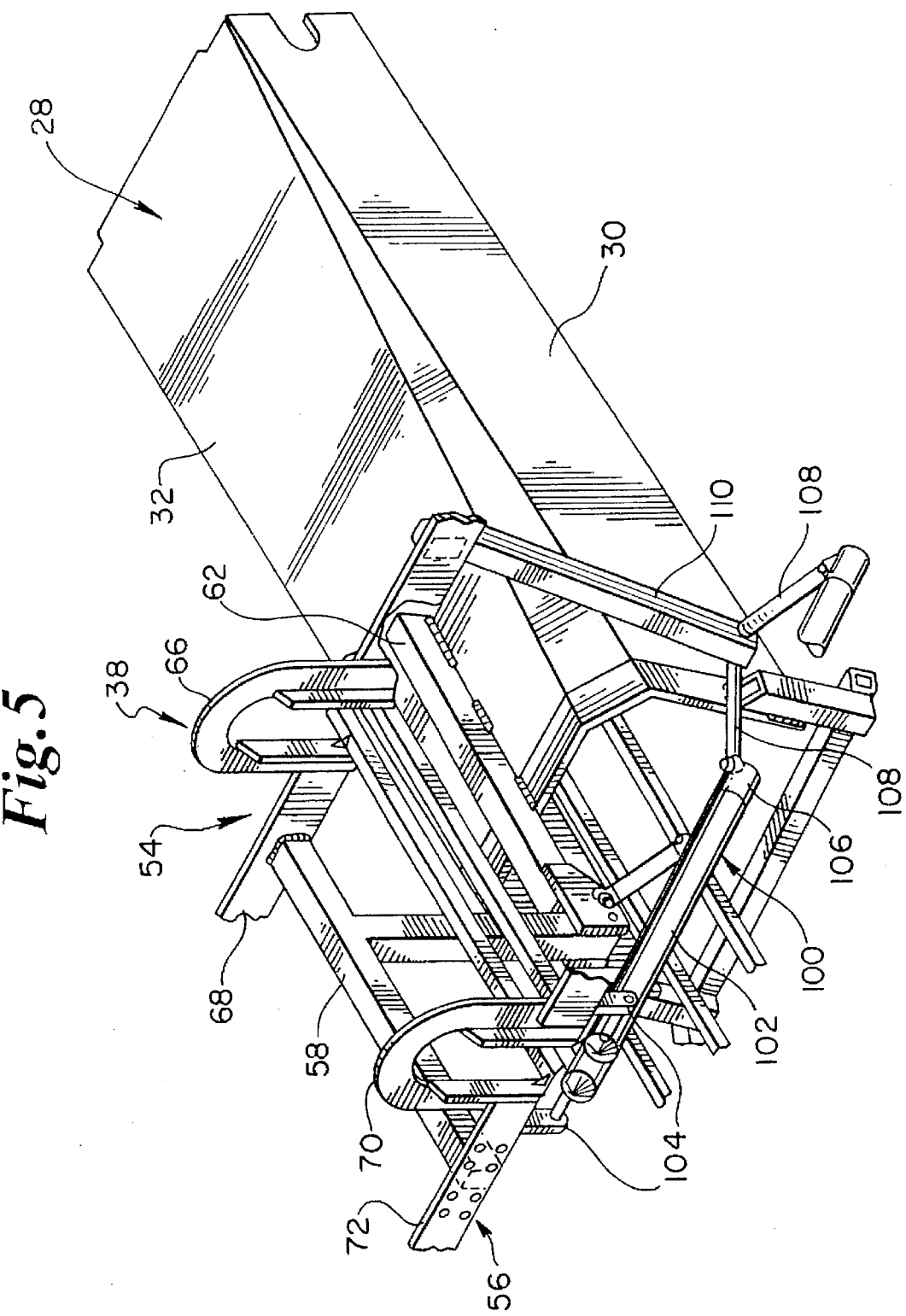
FIG. 5 is a detailed isometric view of a portion of the gathering unit frame.
Figure 6:
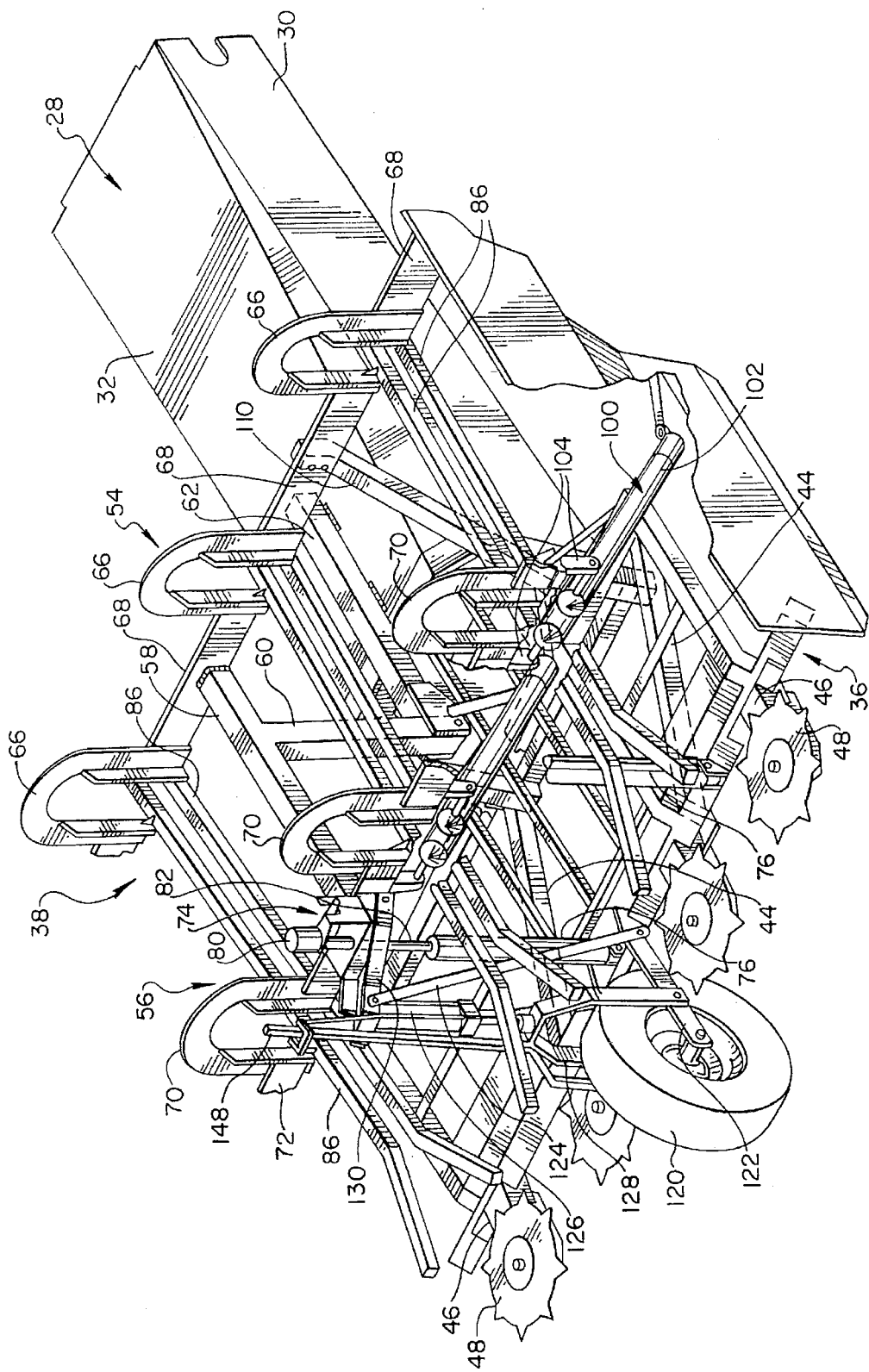
FIG. 6 is a detailed isometric view of a portion of the harvester shown in FIG. 1.

Gathering mechanisms 26 each include a pair of spaced support tubes 86 which extend between rearward frame section 54 and forward frame section 56 on opposite sides of the associated arches 66 and 70. Support tubes 86 are generally parallel to one another, but have forward ends which diverge. As perhaps best shown in FIGS. 2 and 3, a drive pulley 88 is rotatably mounted to the rearward end of each support tube 86, and a forward pulley 90 is rotatably mounted to the forward end of each support tube. Pinch belts 92 (shown in FIG. 4) extend around pulleys 88 and 90. A plurality of guide pulleys 94 (shown in FIG. 4) are mounted along the length of support tubes 86 to urge the adjacent portions of pinch belts 92 into a closely spaced relationship with respect to one another. Hydraulic gathering mechanism drive motors 96 are mounted to the rearward ends of support tubes 86 to rotate drive pulleys 88 and drive pinch belts 92. As shown in FIG. 4, the upper portions of corn stalks that enter the forward ends of gathering mechanisms 26 are engaged by the adjacent pinch belts 92 and pulled through harvester 10 under the arches 66 and 70. Guides 98 (shown in FIG. 1) extending from the forward ends of support tubes 86 guide the corn stalks into the gathering mechanisms 26 as the harvester 10 is driven through the field. Stripping mechanisms 100 are mounted to gathering unit frame 38 below each gathering mechanism 26. Each stripping mechanism 100 includes a pair of adjacent and angularly oriented stripper rollers 102. Upper and forward ends of stripping rollers 102 are rotatably mounted to brackets 72 below the pinch belts 92 by mounts 104. Stripping rollers 102 are rotated by hydraulic motors 106 which are mounted to the lower and rearward ends of the stripping rollers. Motors 106 are supported from gathering unit frame 38 by mounting brackets 108 which extend from either support post 60 or brackets 110. It is desirable to mount the stripping roller drive motors 106 as close as possible to the rotational axis at which support post 60 rotates with respect to bracket 62. Clearance between the lower ends of stripping rollers 102 and conveyors 112 and 114 is thereby maintained when gathering unit frame 38 is raised and lowered, to facilitate the transfer of harvested ears of corn by the conveyors. By way of example, it is desirable to mount stripping roller drive motors 106 within ten inches of the pivot axis of gathering unit frame 38.

Both gathering mechanism drive motors 96 and both stripping roller drive motors 106 of each associated gathering mechanism 26 and stripping mechanism 100 are fluidly coupled in a gathering/stripping hydraulic circuit to a pump (not shown) in chassis 12. The gathering/stripping hydraulic circuits include operator-actuated controls (also not shown) in operator compartment 16 to control the flow of hydraulic fluid to the motors 96 and 106. Stripping rollers 102 are rotated by motors 106 in a direction which corresponds to the motion of pinch belts 92. As the corn stalks are pulled through harvester 10 by gathering mechanisms 26, they are also drawn into the rotating stripping rollers 102. This motion causes the ears of corn to be pulled off the stalks.

As shown in FIG. 4, harvester 10 also includes a central conveyor 112 and a pair of feed conveyors 114. Feed conveyors 114 are transversely oriented on opposite sides of the harvester 10 below stripping mechanisms 100. Ears of corn pulled from the stalks by harvesting units 22 drop onto feed conveyors 114. The feed conveyors 114 then move the ears of corn to the center of harvester 10 before dropping the ears onto conveyor 112. Conveyor 112 extends from chassis 12 through mounting frame 28 to boot bar 40, and transports the harvested ears of corn from feed conveyors 114 into the chassis.

A gauge wheel 120 is pivotally mounted to the boot bar 40 by fork 122. The gauge wheel 120 extends forwardly from the center of the boot bar 40 in the illustrated embodiment. The height of gauge wheel 120 with respect to the boot bar 40, and therefore the cut height of the harvester 10, is adjusted by a linkage including tie link 124, hydraulic cylinder 126, yoke 128 and swing link 130. Yoke 128 is mounted to fork 120 between gauge wheel 120 and boot bar 40, and extends upwardly over the wheel. The rod 132 of hydraulic cylinder 126 is mounted to the upper end of yoke 128. The lower end of tie link 124 is pivotally mounted to fork 122 adjacent to boot bar 40. The upper end of tie link 124 is pivotally mounted to both the base of hydraulic cylinder 126 and the forward end of swing link 130. The rearward end of swing link 130 is pivotally mounted to forward frame section 56 of gathering unit frame 38. An indexed height gauge stake 140 extends upwardly from fork 120.

Hydraulic cylinder 126 is coupled to the header height hydraulic circuit by a float block (not shown) which controls the distribution of hydraulic fluid between mounting frame hydraulic cylinders 34 and gauge wheel hydraulic cylinder 126 in such a manner that most of the weight of harvester 10 is supported by the mounting frame hydraulic cylinders. When the header height hydraulic circuit is operated in the height adjustment mode, the mounting frame hydraulic cylinders 34 and gauge wheel hydraulic cylinder 126 are actuated to raise and lower the harvester 10 with respect to the chassis 12 and ground, and thereby adjust the cut height of harvester 10. The cut height can be monitored from within operator compartment 16 by reading height gauge stake 140. When the header height hydraulic circuit is operated in the floating mode, gauge wheel 120 effectively functions as a ground height sensor, causing the hydraulic circuit to distribute fluid between mounting frame cylinders 34 and gauge wheel cylinder 126 in such a manner as to maintain cutters 24 at a constant cut height as the contour of the ground changes.

Another embodiment (not shown) of the fresh market sweet corn harvester in accordance with the present invention is configured to be pulled behind a tractor or other drive implement. This embodiment includes a frame mounted to wheels for over-the-ground travel. One or more harvesting units similar to those described above with respect to harvester 10 are mounted to the frame. In this embodiment, however, the actuator for setting the cut height is a manually actuated turnbuckle. A manually actuated hand wheel is used as the actuator to rotate the screw jacks and raise and lower the gathering unit frame. A gauge wheel is mounted to a leading edge of the frame. In still other embodiments (not shown), a harvester such as 10 with independently adjustable cut height and stripping window height can be configured to be mounted to a conventional three-point hitch.

Harvester 10 has considerable advantages. In particular, the cut height and the stripping window height can be conveniently and independently adjusted by an operator from within the operator compartment. The cut height can therefore be set as high as possible to minimize the length of corn stalks that must be pulled through the stripping mechanisms during the harvesting operation. The height of the stripping window can be reduced as much as possible to optimize the operation of the stripping mechanisms. The harvester can therefore be used for many different varieties of corn produced in a range of growing conditions. The cut height and stripping window height can also be quickly adjusted by the operator during the harvesting operation to accommodate varying corn and field characteristics within a given field being harvested. These features enable the harvester to operate efficiently while providing hand-picked quality fresh market sweet corn. The harvester is also highly reliable.

Although the present invention has been described with reference to preferred embodiments, those skilled in the art will recognize that changes can be made in form and detail without departing from the spirit and scope of the invention.

What is claimed is:

1. A fresh market sweet corn harvester for removing ears of corn from corn stalks, the harvester configured for over-the-ground travel and including:

a mounting frame;

one or more cutters mounted with respect to the mounting frame, for cutting lower portions of the corn stalks at a cut height above the ground;

a cut height actuator mounted with respect to the mounting frame for raising and lowering the cutters to adjust the cut height;

one or more gathering mechanisms mounted with respect to the mounting frame, for engaging the corn stalks cut by the cutters and pulling the stalks through the harvester;

one or more stripping mechanisms mounted with respect to the mounting frame at a stripping window height above the cutters, for removing ears of corn from the cut stalks pulled through the harvester by the gathering mechanisms; and a stripping window actuator mounted with respect to the mounting frame for raising and lowering the stripping mechanisms with respect to the cutters to adjust the stripping window height.

2. The fresh market sweet corn harvester of claim 1 and further including a drive chassis mounted to the harvester, the drive chassis comprising:

an operator compartment;

an operator-actuated cut height control in the operator compartment, the cut height control coupled to the cut height actuator to enable adjustment of the cut height from within the operator compartment; and an operator-actuated stripping window height control in the operator compartment, the stripping window height control coupled to the stripping window actuator to enable adjustment of the stripping window height from within the operator compartment.

3. The fresh market sweet corn harvester of claim 2 wherein:

the cut height actuator includes one or more hydraulic actuators coupled to the operator-actuated cut height control by a cut height hydraulic circuit; and the stripping window actuator includes one or more hydraulic actuators coupled to the operator-actuated stripping window height control by a stripping window height hydraulic circuit.

4. The fresh market sweet corn harvester of claim 1 wherein:

the harvester further includes a gathering unit frame, and the gathering mechanisms and stripping mechanisms are mounted to the gathering unit frame; and the stripping window actuator raises and lowers the gathering unit frame with respect to the cutters.

5. The fresh market sweet corn harvester of claim 4 wherein the stripping window actuator includes one or more screw jacks for raising and lowering the gathering unit frame with respect to the cutters.

6. The fresh market sweet corn harvester of claim 5 wherein the stripping window actuator includes stripping window hydraulic motors for actuating the screw jacks.

7. The fresh market sweet corn harvester of claim 5 and further including a pivot mount for pivotally mounting the gathering unit frame to the mounting frame.

8. The fresh market sweet corn harvester of claim 4 and further including a pivot mount for pivotally mounting the gathering unit frame to the mounting frame.

9. The fresh market sweet corn harvester of claim 1 and further including a drive chassis mounted to the harvester, and wherein:

the harvester further includes a lower frame mounted to the mounting frame, and the cutters are mounted to the lower frame; and the cut height actuator is configured to raise and lower the mounting frame with respect to the drive chassis.

10. The fresh market sweet corn harvester of claim 9 wherein:

the harvester further includes a gauge wheel pivotally mounted to the lower frame; and the cut height actuator includes:

one or more hydraulic cylinders for raising and lowering the gauge wheel with respect to the lower frame; and one or more hydraulic cylinders configured to raise and lower the mounting frame with respect to the drive chassis.

11. A fresh market sweet corn harvester for removing ears of corn from corn stalks, the harvester configured to be mounted to a drive chassis for over-the-ground travel and including:

a lower frame;

one or more cutters mounted to the lower frame, for cutting lower portions of the corn stalks at a cut height above the ground;

a cut height actuator mounted to the lower frame for raising and lowering the lower frame to adjust the cut height;

an upper frame movably mounted with respect to the lower frame;

one or more gathering mechanisms mounted to the upper frame, for engaging upper portions of the cut corn stalks and pulling the stalks through the harvester;

one or more stripping mechanisms mounted to the upper frame at a stripping window height above the cutters, for removing ears of corn from the cut stalks pulled through the harvester by the gathering mechanisms; and a stripping window actuator mounted to the upper frame for raising and lowering the upper frame with respect to the lower frame to adjust the stripping window height.

12. The fresh market sweet corn harvester of claim 11 and further including a drive chassis mounted to the harvester, the drive chassis comprising:

an operator compartment;

an operator-actuated cut height control in the operator compartment, the cut height control coupled to the cut height actuator to enable adjustment of the cut height from within the operator compartment; and an operator-actuated stripping window height control in the operator compartment, the stripping window height control coupled to the stripping window actuator to enable adjustment of the stripping window height from within the operator compartment.

13. The fresh market sweet corn harvester of claim 12 wherein:

the cut height actuator includes one or more hydraulic actuators coupled to the operator-actuated cut height control by a cut height hydraulic circuit; and the stripping window actuator includes one or more hydraulic actuators coupled to the operator-actuated stripping window height control by a stripping window height hydraulic circuit.

14. The fresh market sweet corn harvester of claim 13 wherein the stripping window actuator includes:

one or more screw jacks for raising and lowering the gathering unit frame with respect to the cutters; and stripping window hydraulic motors for actuating the screw jacks.

15. The fresh market sweet corn harvester of claim 14 and further including a pivot mount for pivotally mounting the gathering unit frame to the mounting frame.

16. The fresh market sweet corn harvester of claim 11 and further including a pivot mount for pivotally mounting the gathering unit frame to the mounting frame.

17. The fresh market sweet corn harvester of claim 11 wherein:

the harvester further includes a gauge wheel pivotally mounted to the lower frame; and the cut height actuator includes:

one or more hydraulic cylinders for raising and lowering the gauge wheel with respect to the lower frame; and one or more hydraulic cylinders configured to raise and lower the mounting frame with respect to the drive chassis.

18. A fresh market sweet corn harvester for removing ears of corn from corn stalks, including:

a frame;

at least one cutter mounted with respect to the frame, for cutting lower portions of corn stalks at a cut height above the ground;

a cut height actuator mounted with respect to the frame for raising and lowering the cutter to adjust the cut height;

at least one gathering mechanism mounted with respect to the frame, for engaging the corn stalks cut by the cutter and pulling the stalks through the harvester;

at least one stripping mechanism mounted with respect to the frame at a stripping window height above the cutters, for removing ears of corn from the cut stalks pulled through the harvester by the gathering mechanism; and a stripping window actuator mounted with respect to the frame for raising and lowering the stripping mechanism with respect to the cutters to adjust the stripping window height.

19. The fresh market sweet corn harvester of claim 18 wherein the cut height actuator is a manually-actuated actuator.

20. The fresh market sweet corn harvester of claim 18 wherein the stripping window actuator is a manually-actuated actuator.

* * * * *